United States Patent [19]
Dreisinger et al.

[11] Patent Number: 5,948,264
[45] Date of Patent: Sep. 7, 1999

[54] ION EXCHANGE AND REGENERATION PROCESS FOR SEPARATION AND REMOVAL OF IRON (III) IONS FROM AQUEOUS SULFURIC ACID METAL ION-CONTAINING SOLUTIONS

[75] Inventors: David B. Dreisinger, Delta, Canada; D. Richard Shaw, Alloa, United Kingdom

[73] Assignee: Eichrom Industries, Inc., Darien, Ill.

[21] Appl. No.: 09/019,677

[22] Filed: Feb. 6, 1998

[51] Int. Cl.[6] .................................................. C02F 1/42
[52] U.S. Cl. .......................... 210/673; 210/688; 210/670; 423/531; 204/DIG. 13
[58] Field of Search ..................... 210/673, 688, 210/670, 672; 423/531; 204/DIG. 13

[56] References Cited

U.S. PATENT DOCUMENTS

| | | | |
|---|---|---|---|
| 3,224,873 | 12/1965 | Swanson | 75/101 |
| 3,440,036 | 4/1969 | Spinney | 75/117 |
| 3,761,249 | 9/1973 | Ritcey et al. | 75/101 |
| 4,083,758 | 4/1978 | Hamby et al. | 204/106 |
| 4,100,043 | 7/1978 | Chou et al. | 204/108 |
| 4,167,481 | 9/1979 | Cremers et al. | 210/688 |
| 4,272,492 | 6/1981 | Jensen | 423/24 |
| 4,329,210 | 5/1982 | Merchant et al. | 204/107 |
| 4,350,667 | 9/1982 | Andersson et al. | 423/24 |
| 4,559,216 | 12/1985 | Nagai et al. | 423/531 |
| 4,900,522 | 2/1990 | Chou et al. | 423/139 |
| 5,108,615 | 4/1992 | Hosea et al. | 210/688 |
| 5,112,392 | 5/1992 | Anderson et al. | 210/726 |
| 5,192,418 | 3/1993 | Hughes et al. | 210/688 |
| 5,281,631 | 1/1994 | Horwitz et al. | 210/681 |
| 5,449,462 | 9/1995 | Horwitz et al. | 210/682 |
| 5,451,323 | 9/1995 | Akao et al. | 210/665 |
| 5,500,126 | 3/1996 | Fries | 210/688 |
| 5,520,814 | 5/1996 | Celi | 210/638 |
| 5,582,737 | 12/1996 | Gula et al. | 210/673 |
| 5,618,851 | 4/1997 | Trochimcznk et al. | 521/34 |

*Primary Examiner*—Cynthia L. Nessler
*Attorney, Agent, or Firm*—Welsh & Katz, Ltd.

[57] ABSTRACT

An ion exchange separation, recovery and regeneration process for the control of iron is disclosed that can replace the conventional bleed stream process used in copper electrowinning. The disclosed process minimizes the loss of cobalt from the electrowinning circuit and can effect a lowering of the total iron concentration in the electrolyte circuit with an associated increase in current efficiency. The process captures the iron as iron(III) on an ion exchange medium containing a plurality of —CH(PO$_3$R$_2$)$_2$ or —C(PO$_3$R$_2$)$_2$— groups through which the divalent metal ions pass. The iron(III) is then reduced with copper(I) to form iron(II) that is freed from the exchange medium, thereby permitting regeneration of the medium.

21 Claims, 3 Drawing Sheets

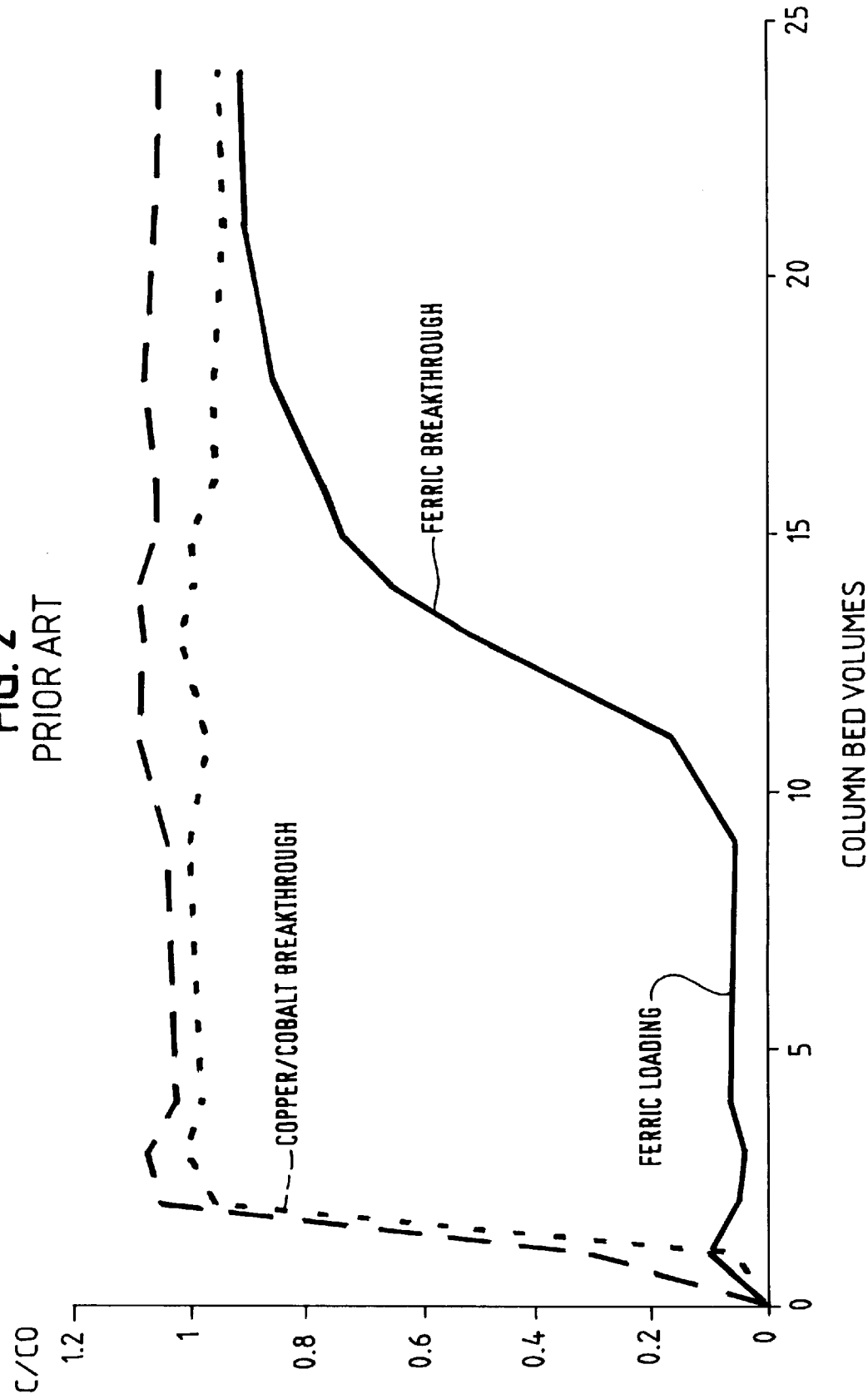

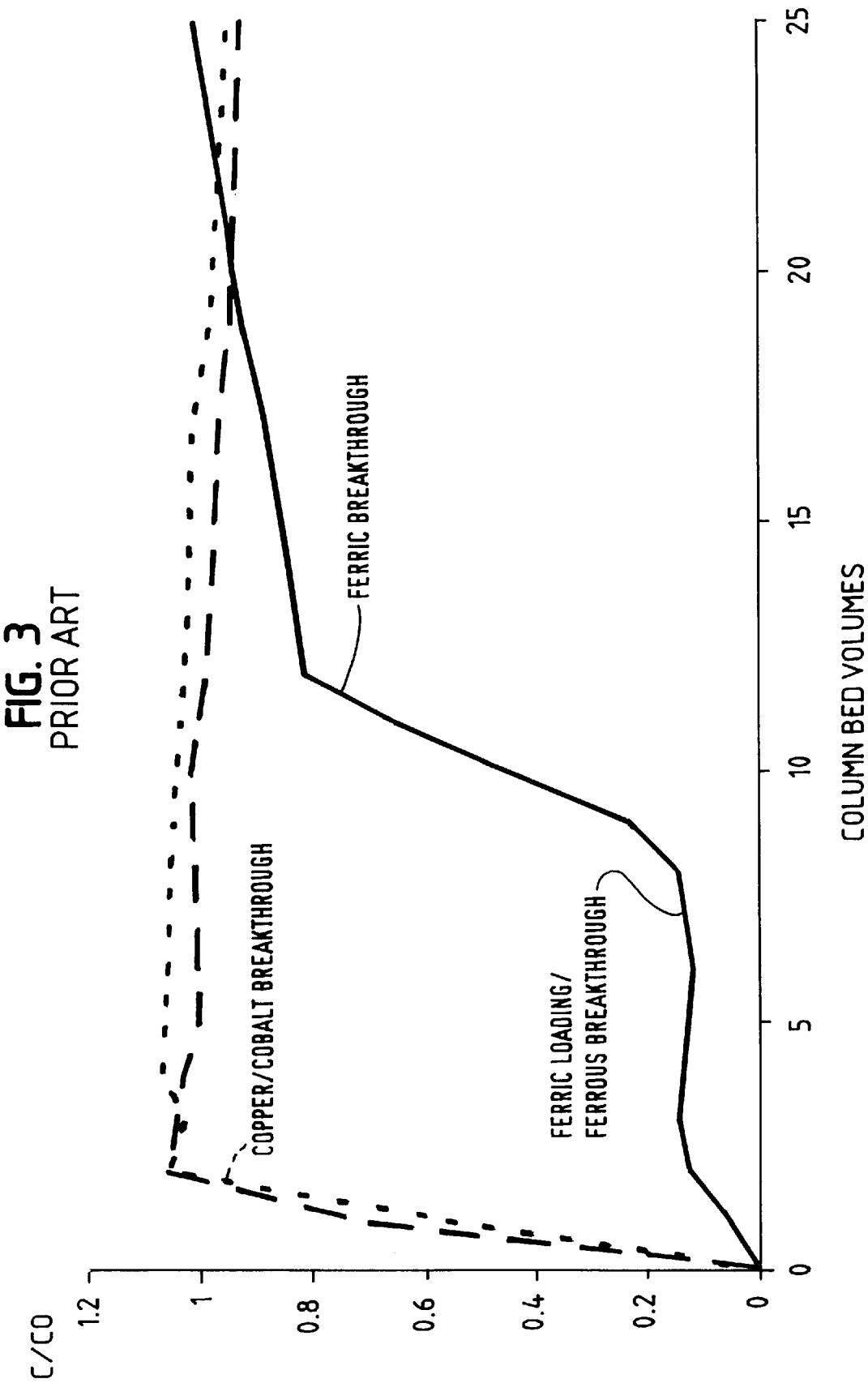

ION EXCHANGE AND REGENERATION PROCESS FOR SEPARATION AND REMOVAL OF IRON (III) IONS FROM AQUEOUS SULFURIC ACID METAL ION-CONTAINING SOLUTIONS

CROSS REFERENCE TO RELATED APPLICATION

This application is related to application Ser. No. 08/554,472 filed Nov. 7, 1995 that is now U.S. Pat. No. 5,582,737, whose disclosures are incorporated by reference.

DESCRIPTION

1. Technical Field

The present invention relates to an improved ion exchange and regeneration process for the separation and removal of iron(III) ions from aqueous metal ion-containing sulfuric acid solutions, and particularly to a process for the regeneration of phosphonic acid ion exchange resins having bound iron(III) ($Fe^{3+}$ ions) used for iron removal from a spent electrolyte solution obtained in a solvent extraction copper electrowinning solution.

2. Background of the Invention

Copper metal is obtained from copper ores by several well-known processes. One of the most frequently used processes is referred to as a solvent extraction-electrowinning (SX-EW) process in which copper ions are first leached from the ore using sulfuric acid followed by extraction with a kerosene-type solvent mixture. The copper is then stripped from the solvent mixture using a copper sulfate-sulfuric acid electrolyte solution ($CuSO_4$—$H_2SO_4$ electrolyte solution). The copper recovery process is then completed by electroplating copper from the copper-enriched strip solution.

Small amounts of iron are commonly transferred with the copper to the electroplating solution. Iron transfer occurs by chemical co-extraction (binding to the oxime molecule) and by entrainment of iron-containing aqueous solution in the copper-loaded organic solution. As copper is depleted from the $CuSO_4$—$H_2SO_4$ electrolyte solution during copper electrowinning (EW), the concentration of iron in solution increases. This build up of iron in solution results in a loss of current efficiency in the electrowinning process due to a continuous oxidation/reduction of $Fe^{2+}/Fe^{3+}$. That loss of current efficiency can amount to about 2–3 percent per gram of iron in solution. The conventional treatment technique for iron control has been to periodically bleed a portion of the iron-rich, copper-depleted electrolyte and replace it with a sulfuric acid electrolyte solution.

In a copper electrowinning process, lead-based alloys are used as oxygen-evolving anodes. Soluble cobalt (50–200 ppm) is added to the aqueous sulfuric acid copper-containing electrolyte to control corrosion of the lead anode, and to prevent "spalling" and possible lead contamination of the copper cathode. During bleed of the spent (copper-depleted) electrolyte to control iron concentration, cobalt is lost from the system. Cobalt must be continually added to the electrowinning electrolyte to make up cobalt lost through the bleed stream. Cobalt replacement to control lead anode corrosion is a major operating expense in copper SX-EW plants. Removal of the iron from the electrowinning electrolyte solution while retaining the cobalt is desired.

Sulfonic acid functional group cation exchange resins are widely used in the water treatment industry and other industrial processes for the removal of cations, such as iron, from aqueous process streams. Such resins also bind and accumulate other cations, such as calcium, magnesium, and sodium, that are undesirable in an iron removal process, necessitating frequent regeneration of the resin.

Gula et al., U.S. Pat. No. 5,582,737, the disclosures of which are incorporated herein by reference, describe a process that separates and removes iron(III) from aqueous sulfuric acid solution containing additional metal ions such as copper and cobalt ions as are found in depleted copper electrowinning electrolyte solutions. That process utilizes gem-diphosphonic acid ion exchange particles to remove the iron(III) ions, while permitting (1) copper, cobalt and other mono- and divalent metal ions to be recycled into the copper electroplating recovery process, thereby saving on the costs of cobalt that would otherwise be discarded, and (2) regeneration of the ion exchange particles for further use and recycle to the separation and removal steps.

The process for regenerating the gem-diphosphonic acid ion exchange particles used in the above process disclosed by Gula, et al. involves use of sulfurous acid ($H_2SO_3$) to reduce the bound iron(III) ions to iron(II) ions that are free in solution. The sulfurous acid is usually generated prior to the iron(III) reduction step by purging an aqueous solution with $SO_2$ gas, which dissolves to form $H_2SO_3$. The use of $SO_2$ gas in the Gula, et al. regeneration process raises issues relating to the availability of $SO_2$, the costs of the sulfur dioxide storage and delivery systems, and pressurization of the system needed to maintain $SO_2$ dissolution.

Gula et al. disclose that in their regeneration process, the addition of at least a catalytic amount of copper(I) ions was found to increase the efficiency of $SO_2$-caused regeneration. The catalytic amount of copper(I) ions could be added to the copper electrowinning bleed solution itself, or could be provided, for example as a copper(I) sulfate solution prepared expressly for this purpose. Alternatively, a solution of sulfuric acid ($H_2SO_4$) containing copper(II) ions could be passed over copper metal and then sparged with $SO_2$ gas to form the sulfurous acid solution containing a catalytic amount of copper(I).

An improved gem-diphosphonic acid ion exchange resin regeneration process of the invention disclosed hereinbelow avoids use of $SO_2$ as a reductant by instead using at least about a stoichiometric amount of copper(I) ions to reduce the resin-bound iron(III). This process is discussed in the disclosure that follows.

BRIEF SUMMARY OF THE INVENTION

The present invention relates to an improved ion exchange and regeneration process for the separation and removal of iron(III) ($Fe^{3+}$ ions) from aqueous metal ion-containing sulfuric acid solutions. In accordance with this invention, a contemplated process comprises the following steps.

(a) An aqueous metal ion-containing sulfuric acid solution that contains iron(III) ions as well as ions having a valence of less than +3 of at least one additional metal is contacted with solid ion exchange medium that is preferably in the form of particles. The ion exchange medium binds to the iron(III) ions in preference to the additional metal ions present to form a solid/liquid phase admixture. The ion exchange medium is comprised of insoluble cross-linked copolymer preferably present as particles having a plurality of pendent geminal diphosphonate groups. The pendent geminal diphosphonate groups have the formula —$CR^1(PO_3R_2)_2$ or —$C(PO_3R_2)_2$—. In the formulae, R is either a mono- or a divalent cation, and $R^1$ is hydrogen or a $C_1$–$C_2$ alkyl group. A particularly preferred ion exchange medium also contains a plurality of pendent aromatic sulfonic acid ($-SO_3H$) groups.

(b) The contact is maintained between the sulfuric acid solution containing iron(III) ions and a sufficient amount of solid ion exchange particles for a time period sufficient to form solid phase-bound iron(III) ions and an aqueous liquid phase containing sulfuric acid and the additional metal ions.

(c) The solid and liquid phases are separated.

(d) The separated solid phase-bound iron(III) ions are contacted with an added $SO_2$-free aqueous reducing solution, thereby forming a second solid/liquid phase admixture. The added $SO_2$-free aqueous reducing solution contains 0.1 to about 6 molar aqueous sulfuric acid and an amount of copper(I) ions sufficient to reduce the solid phase-bound iron(III) ions to iron(II) ions, and is free of added $SO_2$ or $H_2SO_3$.

(e) The second solid/liquid phase admixture is maintained at a temperature of about 65° C. to about 95° C. for a time period sufficient to form a liquid phase of aqueous sulfuric acid containing iron(II) ions and a solid phase of regenerated ion exchange particles.

(f) The iron(II)-containing liquid phase is separated from the regenerated solid phase ion exchange particles.

In one embodiment of the invention, the copper(I) ion-containing aqueous reducing solution is prepared by dissolving copper(0) in a 0.1 to about 6 molar aqueous sulfuric acid solution. Alternatively, a copper(I) salt is dissolved directly in a 0.1 to about 6 molar aqueous sulfuric acid solution.

In another embodiment of the invention, the 0.1 to about 6 molar aqueous sulfuric acid solution used to make the copper(I) ion-containing aqueous reducing solution is a spent electrolyte solution from a solvent extraction copper electrowinning process.

In yet another embodiment of the invention, the 0.1 to about 6 molar aqueous sulfuric acid solution used to make the copper(I) added $SO_2$-free aqueous reducing solution is recycled from an ion exchange medium regeneration process, and already contains some iron(II) ions.

Another embodiment of the present invention relates to an improved process for the regeneration of ion exchange resin having bound iron(III) ions ($Fe^{3+}$ ions). In accordance with this invention, a contemplated ion exchange resin regeneration process for a resin used in the separation and removal of iron(III) ions from an aqueous metal ion-containing sulfuric acid solution comprises the following steps.

(a) Ion exchange medium containing bound iron(III) atoms is contacted with an aqueous copper(I) ion solution to form a solid/liquid phase admixture. The solution contains an amount of copper(I) ions effective to reduce the iron(III) atoms and is free of added $SO_2$. The solution of copper(I) ions also contains 0.1 to about 6 molar sulfuric acid. The ion exchange medium comprises an insoluble cross-linked copolymer having a plurality of pendent geminal diphosphonate groups of the formula $-CR^1(PO_3R_2)_2$ or $-C(PO_3R_2)_2-$, wherein R is either a mono- or a divalent cation such as hydrogen, ammonium, an alkali metal cation, or $R_2$ (i.e. the two R groups together) is a divalent cation, and $R^1$ is hydrogen or a $C_1-C_2$ alkyl group. A particularly preferred ion exchange medium also contains a plurality of pendent aromatic sulfonic acid ($-SO_3H$) groups.

(b) The contact between a sufficient amount of the solid ion exchange medium and the added $SO_2$-free aqueous solution of copper(I) ions is maintained at a temperature of about 65° C. to about 95° C. for a time period sufficient to reduce the solid phase-bound iron(III) ions to iron(II) ions, and to form a liquid phase containing iron(II) ions and regenerated solid phase ion exchange medium.

(c) The iron(II) ion-containing liquid phase is then separated from the solid phase ion exchange medium.

The copper(I) ion solution is made as described above.

BRIEF DESCRIPTION OF THE DRAWINGS

In the drawings forming a part of this disclosure:

FIG. 2 is a graph identical to that of FIG. 1 of the aforementioned U.S. Pat. No. 5,582,737 to Gula et al., of loading curves obtained using simulated copper electrolyte bleed solutions containing $Fe^{3+}$, $Cu^{2+}$, and $Co^{2+}$ ions in an aqueous sulfuric acid (150 g/L $H_2SO_4$) solution. The ordinate is in units of the ratio of processed solution concentrations $C/C_o$ (C=effluent concentration and $C_o$=feed concentration) versus the effluent throughput in column bed volumes. Initial concentrations were $Fe^{3+}$=1250 mg/L (solid line); $Cu^{2+}$=40 g/L (dotted line); and $Co^{2+}$=100 mg/L (dashed line). Regions of the curves at which particle loading and ion breakthrough occur are noted with arrows.

FIG. 3 is a graph similar to that of FIG. 2 and identical to that of FIG. 2 of the aforementioned U.S. Pat. No. 5,582,737 in which an actual SX-EW plant electrolyte bleed was utilized. Axes and data are as in FIG. 2. Initial concentrations were: $Fe^{3+}$=1200 mg/L (solid line); $Cu^{2+}$=33 g/L (dotted line); and $Co^{2+}$=72 mg/L (dashed line).

Figure 1:
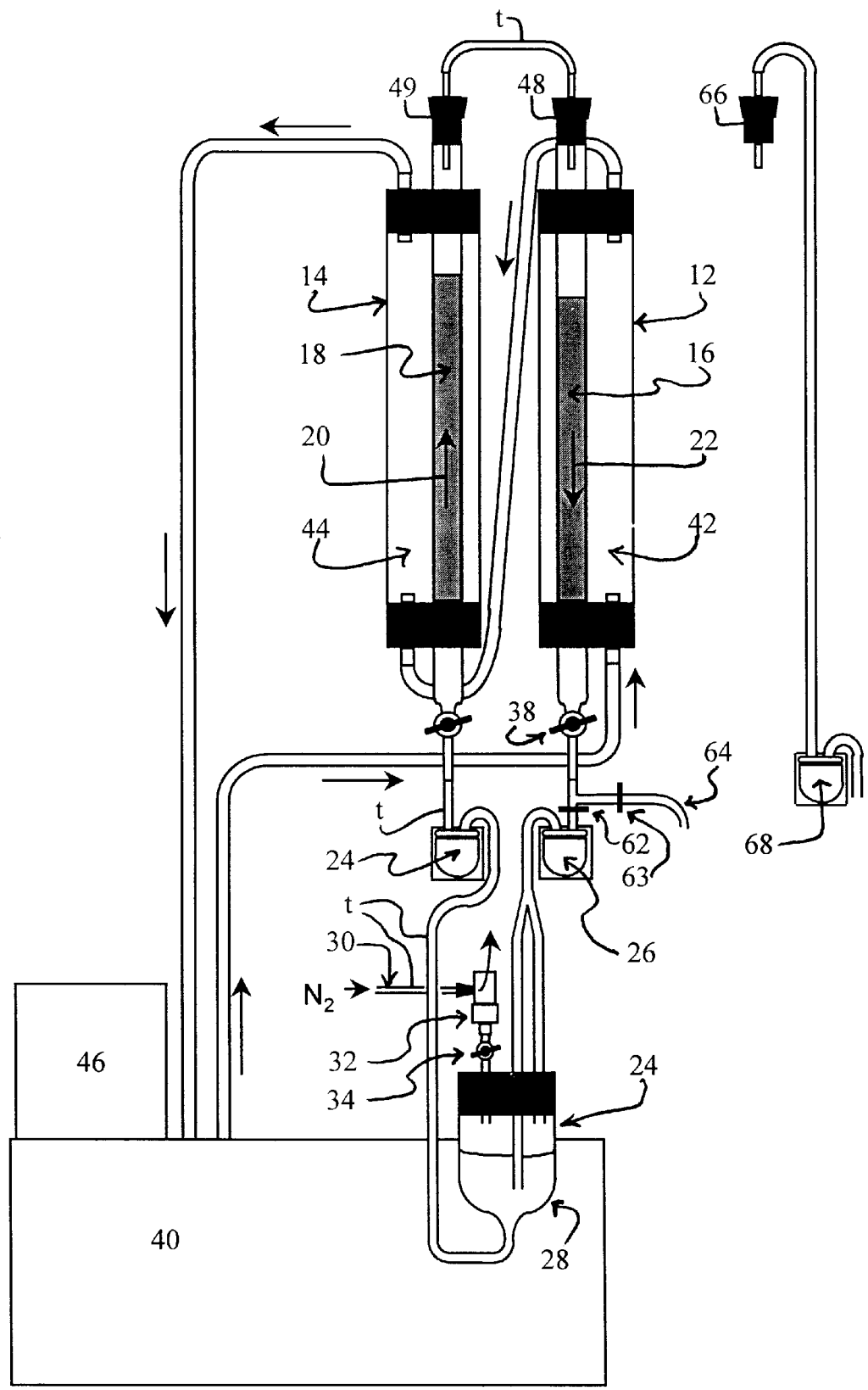
FIG. 1 is an illustration of the equipment arrangement utilized to carry out Example 1.

The present invention has several benefits and advantages.

A benefit of a contemplated process is that sulfurous acid or $SO_2$ gas is neither needed nor used to regenerate the ion exchange particles.

An advantage of the invention is that a contemplated ion exchange resin regeneration process provides an improved step in a process that effectively separates iron(III) ions from a depleted copper electrowinning electrolyte that also contains cobalt ions so that the cobalt ions can be returned to the electrowinning solution, thereby eliminating the requirement for continuing purchases of large quantities of that expensive metal.

Another benefit of a contemplated process is that a contemplated regeneration process can be repeated with the ion exchange medium at least several hundred times, permitting reuse of the ion exchange medium.

Another advantage of a contemplated process is that spent electrowinning electrolyte solution can be used to regenerate the ion exchange medium after the addition of copper(I) ions to the spent electrowinning electrolyte solution.

Yet another benefit of a contemplated process is that additional copper(I) ions can be dissolved in the solution previously used to regenerate the ion exchange medium, thereby permitting the solution to be re-used to remove still more bound iron(III) ions from the ion exchange medium.

Yet another advantage of a contemplated process is that the only chemical addition is copper ions, which can be recovered from the iron(II) containing solution by returning the regeneration solution to the copper leachate.

Yet another benefit of the invention is that a contemplated ion exchange resin regeneration process effectively removes iron(III) ions from the ion exchange medium, enabling the re-use of the ion exchange resin in a process for the removal of iron(III) ions from a copper-depleted copper electrowinning electrolyte solution.

Still further benefits and advantages of the invention will be apparent to the skilled worker from the discussion that follows.

DETAILED DESCRIPTION OF THE INVENTION

The present invention contemplates an improved process for the separation and removal of iron(III) ions from an aqueous sulfuric acid solution that also contains additional metal cations having a valence of less than +3. Embodiments of a contemplated process are described herein in terms of electrolyte solutions present in copper SX-EW processes whose metal ions include iron(III), iron(II), copper(II), cobalt(II), and sometimes manganese(II).

In accordance with this invention, one contemplated embodiment is an ion exchange and regeneration process for the separation and removal of iron(III) ions from an aqueous metal ion-containing sulfuric acid solution. This process comprises the following steps.

(a) An aqueous sulfuric acid metal ion-containing solution that contains iron(III) ions as well as ions having a valence of less than +3 of at least one additional metal is contacted with solid ion exchange medium. The solid phase ion exchange medium binds to the dissolved iron(III) ions in preference to the additional metal ions present to form a solid/liquid phase admixture.

The ion exchange medium is comprised of an insoluble cross-linked copolymer having a plurality of pendent geminal diphosphonate groups. The pendent geminal diphosphonate groups have the formula —$CH(PO_3R_2)_2$ or —$C(PO_3R_2)_2$—. In the formulae, R is either a mono- or a divalent cation. A particularly preferred ion exchange medium also contains a plurality of pendent aromatic sulfonic acid (—$SO_3H$) groups.

(b) The contact between the sulfuric acid solution containing iron(III) ions and the ion exchange resin particles is maintained with a sufficient amount of said solid ion exchange particles for a time period sufficient to form solid phase-bound iron(III) ions and an aqueous liquid phase containing sulfuric acid and the additional metal ions.

(c) The solid and liquid phases are separated.

(d) The separated solid phase-bound iron(III) ions are contacted with an $SO_2$-free aqueous reducing solution, thereby forming a second solid/liquid phase admixture. The aqueous reducing solution contains 0.1 to about 6 molar sulfuric acid and an amount of copper(I) ions sufficient to reduce the solid phase-bound iron(III) ions to iron(II) ions.

(e) The second solid/liquid phase admixture is maintained at a temperature of about 65° C. to about 95° C. for a time period sufficient to form a liquid phase of aqueous sulfuric acid containing iron(II) ions and a solid phase of regenerated ion exchange particles.

(f) The iron(II)-containing liquid phase is separated from the regenerated solid phase ion exchange particles.

A contemplated aqueous sulfuric acid metal ion-containing solution is typically a spent or copper-depleted copper electrowinning solution. A contemplated solution can have a sulfuric acid concentration that is from about 0.1 molar to about 8 molar, but more typically has a sulfuric acid concentration of about 0.1 molar to about 6 molar and preferably has a sulfuric acid concentration of about 1 to about 3 molar.

The metal cations present in such a solution can include iron(II), iron(III), copper(II), cobalt(II), and can sometimes include manganese(II) ions. Of those cations, iron ions are typically present at about 1 to about 10 grams/liter (g/L) as iron(III) or a mixture of iron(II) and iron(III) ions. When present as a mixture, as is obtained from a depleted EW solution, iron(II) is typically present at about 15 to about 25 percent of the total iron present. Copper(II) ions are present at about 30 to about 50 g/L, and cobalt ions are typically present at about 0.05 to about 0.2 g/L. Manganese(II) ions can be present at less than about 0.005 to about 0.12 g/L.

Turning now to the ion exchange medium, that water-insoluble material contains pendent geminal diphosphonate groups such as those that have the formula —$CH(PO_3R_2)_2$ or —$C(PO_3R_2)_2$—, wherein R is a mono- or divalent cation such as hydrogen (a proton), ammonium ion ($NH_4^+$) including also a $C_1$–$C_4$ mono-, di-, tri- or tetra-alkyl ammonium ion as are well known, or an alkali metal cation such as lithium, sodium or potassium, or $R_2$ (i.e., two R groups together) are a divalent cation. Any divalent cation can be present such as an alkaline earth metal cation like magnesium, calcium or barium, copper (II), cobalt(II), iron (II) or manganese(II). Thus, under the conditions of this process, iron(III) displaces any mono- or divalent cation that may have originally been present neutralizing the phosphonate groups.

The pendent geminal diphosphonate groups of the ion exchange medium can exchange and also bind to (complex) cations, with complexation usually predominating in strongly acidic conditions; i.e., 1M or higher nitric acid or sulfuric acid, and exchange occurring at higher pH values. Although they act as complexing agents at the pH values used here, these materials are referred to in the art as cation exchangers.

A contemplated gem-diphosphonic acid ion exchange medium (resin) can be prepared from a variety of monomers, and the three preferred copolymer resins are described in Gula, et al., U.S. Pat. No. 5,582,737, whose disclosures are herein incorporated by reference. Preferably, the ion exchange resin is in the form of ion exchange particles.

The three preferred copolymer resins are i) the vinylidene diphosphonic acid (or the alkyl or aryl esters thereof) tetrapolymers described in U.S. Pat. No. 5,281,631; ii) grafted pendent geminal diphosphonate copolymers such as those described in U.S. Pat. No. 5,618,851; and iii) gem-diphosphonate terpolymers such as those described in Sundell et al., *Chem. Mater.*, 5: 372–376 (1993) and Sundell et al., *Polym. Prep.*, 33: 992 (1992).

A copolymer of the first of these materials is the tetrapolymer particles available from Eichrom Industries, Inc. of Darien, Ill. under the name DIPHONIX® ion exchange resin, which is used illustratively herein. Use of DIPHONIX® ion exchange particles is particularly preferred.

A preferred ion exchange medium also contains a plurality of pendent aromatic sulfonic acid (—$SO_3H$) groups. The presence of the sulfonate pendent groups confers the additional advantage of hydrophilicity to the particles and leads to a surprising enhancement in the rate of cation complexation without adversely affecting the observed selectivity. A particularly preferred ion exchange medium contains a plurality of pendent phenyl sulfonate groups.

When styrene is a copolymerized monomer, it is particularly preferred to sulfonate the copolymer particles to provide a copolymer having pendent phenyl sulfonate groups. Any sulfonating agent can be used. Use of chlorosulfonic acid as sulfonating agent with a one hour reaction time at room temperature provides complete sulfonation of the phenyl rings. Subsequent hydrolysis with sodium hydroxide converts the formed chlorosulfonic acid groups to the desired sulfonate groups. Such sulfonation provides particles with enhanced hydrophilicity and microporosity and also typically hydrolyzes some pendent nitrile and ester groups to form pendent carboxylate groups, as well as hydrolyzing the diphosphonate tetraalkyl esters.

A copolymer containing grafted methylene diphosphonate tetraalkyl ester groups is preferably reacted with a sulfonating agent such as chlorosulfonic acid, concentrated sulfuric acid or sulfur trioxide in order to introduce strongly acidic pendent aromatic sulfonic groups into their structure. The reaction of the sulfonating agent with a grafted copolymer containing methylene diphosphonate groups is usually carried out when the recovered resin product in ester form is swollen by a halohydrocarbon such as dichloromethane, ethylene dichloride, chloroform and 1,1,1-trichloroethane. The sulfonation reaction can be performed using 0.5 to 20.0 weight percent of chlorosulfonhalohydrocarbon s the mentioned halohydrocarbon solvents at temperatures ranging from about −25° to about 50° C., preferably at about 10° to about 30° C. The reaction is carried out by contacting resin preswollen for zero (unswollen) to about two hours with the above sulfonation solution for 0.25 to 20 hours, preferably 0.5 to two hours.

Contact between the solution and the ion exchange medium is maintained for a time period sufficient for the medium to bind iron(III) ions. Because of the tight binding (affinity) observed between iron(III) ions and the ion exchange medium, binding to a given medium type is quite rapid and may be diffusion controlled.

However, when used in large quantities or even for accurate laboratory studies of binding coefficients, one to two or even more hours can be used to load the ion exchange medium with iron(III) ions. Thus, the maintenance time utilized can depend upon the user's purposes as well as the individual batch of ion exchange medium. Useful times for contacting can be readily determined by carrying out iron binding studies similar to those illustrated in U.S. Pat. No. 5,582,737, No.5,449,462 and No. 5,281,631 with varying maintenance times for loading the medium with a constant amount of iron(III) ions and a given set of stripping conditions.

In typical practice, the amount of ion exchange medium and concentration of iron(III) to be removed are paired so there is an excess of exchange capacity over the equivalents of iron(III) ions to be removed. Such a pairing minimizes the likelihood that some iron(III) ions will not be separated and removed. Of course, if some iron(III) is desired or can be tolerated, the iron(III) ions can be present in excess over the exchange capacity of the ion exchange medium.

After the solid phase-bound iron(III) ions and aqueous sulfuric acid-containing liquid phase have been formed during the maintenance step, the solid and liquid phases are separated. In a batch process, the solid and liquid phases can be physically separated by simple decantation or centrifugation followed by decantation or other removal of the liquid phase. It is preferred to rinse the separated solid phase with about 1 to about 3 molar aqueous sulfuric acid, with the washings added to the separated liquid phase.

In a preferred process where the ion exchange medium is in the form of particles that are contained in one or more columns, the solid and liquid phase separation is effected by elution. The eluting solution is the above about 1 to about 3 molar sulfuric acid.

The separated liquid phase contains the metal ions of valence less than +3 that did not bind to the particles. In a copper electrowinning situation, copper(II), cobalt(II) and iron(II) ions are present as may be manganese(II) ions. This separated liquid phase can then be returned directly to the copper electrowinning apparatus for further electroplating or to the solvent extraction plant.

It can be desirable to remove iron(II) ions as well as iron(III) ions from the process stream. As noted elsewhere, in a copper EW process, iron(II) ions can constitute about 15–25 percent of the total iron ions present. A simple oxidation with a mild oxidant such as hydrogen peroxide can be used to convert iron(II) ions to iron(III) ions in the aqueous sulfuric acid metal ion-containing solution prior to the above contacting step so that additional iron ions can be separated and removed from the solution in the iron(III) form.

The separated solid phase contains bound iron(III) ions that are removed so that the ion exchange particles can be regenerated and reused. Initial studies showed that increasing concentrations of sulfuric acid could remove up to about 35 percent of the bound iron(III) ions at 65° C. in about one hour. However, sulfuric acid concentrations of 8 molar and above damaged the particles. Increasing temperatures with a constant sulfuric acid concentration between about 50° C. and 85° C. also increased regeneration, but regeneration was still insufficient to be useful in a commercial setting.

It was determined that the ion exchange particles could be regenerated if the iron(III) ions could be reduced to iron(II) ions that are free in solution. The known process of reduction of the iron(III) ions by a reductant such as sulfurous acid was inefficient. In current practice, copper ions in a catalytic amount are added to sulfurous acid reductant, and the efficiency of the sulfurous acid reductant ion exchange particle regeneration [iron(III) stripping] is increased to a useful level. The sulfurous acid solution is often generated in practice by bubbling a solution with pressurized sulfur dioxide ($SO_2$) gas.

It has now been found and is shown herein that the ion exchange resin regeneration process can be improved by using a reducing solution that contains only copper(I) as the reductant and omits added sulfurous acid; i.e., an added $SO_2$-free reducing solution. The copper(I) reducing agent reacts with the iron(III) to form copper(II) and iron(II) ions.

In one preferred embodiment, the copper(I) ions are provided by contacting copper(0) metal with the above-separated liquid phase, or a diluted solution thereof, or by dissolving a copper(I) salt directly into a solution prepared expressly for the purpose of providing these copper ions. There are a few potential sources of the copper(0) metal. Chopped scrap copper wire is readily available from wire manufacturers and is highly reactive. Copper cathode that does not meet commercial purity specifications (off-specification copper cathode) can be recycled to this reactor. Copper "nodules", small nodules or protrusions that have broken away from the final cathode, are recovered in many electrowinning plants. Copper metal in fine form can be precipitated from leach solutions of the leach circuit by adding metallic iron powder or wire. Commercially available copper shot could also be used, for example, a bed of 2–4 mm copper shot. The copper(0) metal dissolves in the acidic solution to form copper(I) ions and provide a reducing copper(I) solution.

The sulfuric acid concentration of this reducing copper(I) solution is typically about 0.1 to about 6 molar, with a concentration of about 1 to about 3 molar being preferred. The ion exchange particles were destroyed by use of an 8.0 M sulfuric acid stripping solution. Sulfuric acid at about 6.0 M appears to be the limit these ion exchange particles can withstand for a long time period at the high temperatures used without degradation.

As noted above, the amount of copper ions present can range from the amount of copper(0) that dissolves into the sulfuric acid solution upward to the limit of solubility of copper(I) in the sulfuric acid solution. The concentration of copper(I) ions present in solution is preferably sufficient to reduce the bound iron(III) on a single contacting with the iron(III)-bound ion exchange medium. The reduction reaction is stoichiometric, so all that is needed is the number of moles of copper(I) ions that is equal to the number of moles of iron(III) ions that are bound on the ion exchange medium, where complete removal of the bound iron(III) is desired.

Without wishing to be bound by theory, the following forward equation is thought to describe the mechanism of iron reduction and stripping from contemplated ion exchange particles, where (bound) indicates a species bound to the particles and (aq) indicates a species in the aqueous phase.

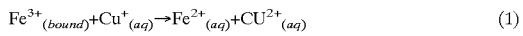

$$Fe^{3+}_{(bound)} + Cu^+_{(aq)} \rightarrow Fe^{2+}_{(aq)} + CU^{2+}_{(aq)} \quad (1)$$

Thus, it is currently believed that the bound iron(III) is directly reduced by the Cu(I) ions. Initial evidence suggests diffusion-limited kinetics for this reduction, rather than chemical control. In contrast, in Gula et al., U.S. Pat. No. 5,582,737, the available evidence indicated that the $SO_2$ reductant acted upon free, unbound, aqueous iron(III).

The temperature at which regeneration (stripping) is carried out also plays a role in process efficiency. It has been found that a temperature of about 95° C. is maximal for stripping, inasmuch as the sulfur dioxide pressure does not provide an adverse consideration in the present invention. It is preferred that the ion exchange regeneration step be carried out at a temperature of at least about 65° C., and more preferably at a temperature of about 65° C. to about 90° C.

The amount of copper(I) ions present is that amount that is sufficient to reduce the bound iron(III) ions to iron(II) ions so that some portion of the ion exchange particles are regenerated. The liquid phase solution containing copper(II) ions and iron(II) ions after reduction of some of the bound iron(III) can be reused by forming in situ or adding more copper(I) ions. The newly-added copper(I) ions reduce more of the bound iron(III), and the solution can be used again until all of the iron(III) is removed from the ion exchange particles.

In preferred practice, the amount of copper(I) ions in the aqueous reducing solution is at least about 300 ppm (about 0.005 M) to about 3 g/L (about 0.05 M) copper (I), and is more preferably at least about 1.5 g/L (about 0.025 M) copper (I). The limit of solubility of copper(I) ions in a contemplated sulfuric acid solution is about 3 g/L (0.05 M), so an amount up to saturation can be utilized.

The second solid/liquid phase admixture formed is maintained at a temperature such as about 65° C. to about 85° C. and for a time period sufficient to form regenerated solid phase ion exchange particles and a liquid phase containing copper(II) ions and iron(II) ions to form. Contrary to most ion exchange loading and stripping situations, the stripping (regeneration) step may be slower here than is the loading step. This is presumably because only a very low concentration of copper(I) ions are present in the aqueous phase at any time due to the relatively low solubility of copper(I) ions in a sulfuric acid medium below the boiling point.

The time required to regenerate the ion exchange particles is a function of a number of variables as has already been discussed. In addition, that time is a function of the amount of regeneration desired. In a commercial setting that desired regeneration is typically about 50 percent. Maximal stripping (regeneration) typically takes about 60 to 240 minutes for a laboratory set up as is described hereinafter.

Although total removal of the iron from the particles can be achieved in consecutive stripping steps, use of a very large number of stripping steps is not always economically desirable. A practical goal is to restore about 80 percent of the functional capacity of the resin, and it would be advantageous to do that in the minimum number of strip sessions. Multiple stripping steps, i.e. the passing through of many bed volumes of copper(I)-containing stripping solution, will often be necessary to achieve a practical amount of regeneration. The contact times and copper(I) amounts are dependent upon the amount of iron removal needed per application.

The regenerated solid phase ion exchange medium is then separated from the iron(II)-containing liquid phase. This separation of phases can be carried out as discussed before, however, in preferred practice where the solid phase ion exchange medium is in particulate form contained within one or more columns, that phase separation is carried out by decantation or other mode of solid/liquid phase separation such as replacement of one liquid by another.

Another embodiment of the present invention relates to an improved process for the regeneration of ion exchange medium having bound iron(III) ions ($Fe^{3+}$ ions). In accordance with this embodiment, a contemplated ion exchange medium regeneration process for an ion exchange medium used in the separation and removal of iron(III) ions from an aqueous sulfuric acid metal ion-containing solution comprises the following steps.

(a) Ion exchange medium such as particles containing bound iron(III) atoms are contacted with a copper(I) ion solution to form a solid/liquid phase admixture. The solution contains an amount of copper(I) ions effective to reduce the iron(III) atoms. The solution of copper(I) ions also contains 0.1 to about 6 molar sulfuric acid. The ion exchange medium comprises exemplary insoluble cross-linked copolymer particles having a plurality of pendent geminal diphosphonate groups of the formula $-CH(PO_3R_2)_2$ or $-C(PO_3R_2)_2-$, wherein R is a mono- or divalent cation such as hydrogen, ammonium, an alkali metal cation, or $R_2$ (i.e. the two R groups together) is a divalent cation. A particularly preferred ion exchange medium again also contains a plurality of pendent aromatic sulfonic acid ($-SO_3H$) groups.

(b) The contact between the ion exchange medium (e.g., resin particles) and the solution of copper(I) ions is maintained with a sufficient amount of the solid ion exchange particles at a temperature of about 65° C. to about 85° C. for a time period sufficient to reduce the solid phase-bound iron(III) ions to iron(II) ions and form a liquid phase containing iron(II) ions and regenerated solid phase ion exchange medium (particles).

(c) The iron(II)-containing liquid phase is then separated from the solid phase ion exchange particles.

The ion exchange medium used in this embodiment is that discussed before in relation to the first embodiment and is preferably in particulate form. The copper(I) ion solution is made as described before. The solid/liquid phase admixture of this process corresponds to the second solid/liquid phase admixture described before.

A process of the invention is illustrated by the following non-limiting examples.

EXAMPLE 1
Recovery of Ferric Ion Using Cuprous Ion

A column of bis-diphosphonic acid ion exchange resin (DIPHONIX® resin, exchange capacity of an average of 8–12 g Fe/L) was loaded with ferric ion. The ferric ion was eluted with a circulating stream of copper sulfate in aqueous sulfuric acid solution that was continuously passed through a column of copper wire pieces. The elution was carried out at 84° C. in order to promote the formation of copper(I) ion.

An illustration of the equipment arrangement 10 used for this study is illustrated in FIG. 1. The arrangement included two columns, an ion exchange column 12 and a copper column 14. Column 12 contained a burette 16 filled with ion exchange resin and the other column 14 contained a burette 18 filled with copper wire pieces. The eluant stream was passed upwardly, as indicated by the arrow at 20, through the copper wire-containing column 14. The passage of acidic copper(II) containing solution, such as the eluant through the copper column 14 generates copper(I) ions. The copper (I)-containing solution was then passed down through the column 12 containing iron(III)-bound ion exchange particles as indicated by the arrow at 22.

The solution exiting the ion exchange burette 16 flowed into a small vessel 24 that served as a reservoir to permit sampling. The solution was then transferred by a pump 24 from the bottom 28 of the reservoir 24 and up through the copper burette 18 again.

Elution was conducted in a closed system to minimize loss of copper(I) ions due to oxidation by air. The reservoir 24 receiving the eluate from the ion exchange column 12 was accessed under a nitrogen flow as indicated at 30.

As shown in FIG. 1, the two columns 12, 14 were arranged side by side. Eluant flow was down through the ion exchange column 12 and into the reservoir 24. The eluant was then transferred by pump 24 from the base 28 of the reservoir 24 up through the copper wire column 14. Exiting the copper column 14, the elution solution again re-entered the ion exchange column 12. Access to the well 24 was through a septum 32 atop a plastic stopcock 34. A stiff piece of tubing (Tefzel®, not shown) was pushed through the septum 32 and the stopcock 34 into the solution. Samples were drawn up into plastic syringes.

During sampling, a rapid flow of nitrogen was passed over the top of the septum 32 via tubing t. After sampling, the stopcock 34 was closed and the tubing on top the septum 32 was stoppered and kept under positive pressure of nitrogen. The stopcock 38 at the bottom of the ion exchange burette 16 was sealed with silicone sealant to minimize air ingress. Heating water from a water bath 40 was passed first up through the jacket 42 around the ion exchange column 16, then up through the jacket 44 around copper wire-containing burette 18. A thermocouple thermometer 46 was used to measure the temperature of the water re-entering the circulating water bath. The water jackets 42, 44 were wrapped with heating tape (not shown) and insulated with glass wool (not shown) to maintain the apparatus at the appropriate temperature. The temperature of the water was 84–85° C.

Prior to elution, the ion exchange resin was conditioned by immersing the ion exchange resin (50–100 mesh) in 200 g/L sulfuric acid overnight (about 16 hours). The ion exchange resin was then packed into the burette 16. The initial ion exchange column bed volume was 47 mL.

The loading solution consisted of 1.48 g/L iron as $Fe_2(SO_4)_3 \cdot 5H_2O$ (97 percent), 35 g/L copper as $CuSO_4 \cdot 5H_2O$, 0.1 g/L cobalt as $CoSO_4 \cdot 7H_2O$, and 160 g/L $H_2SO_4$. This loading solution was passed through the column at a flow rate of 8.3 mL/minute. The column and the loading solution reservoir were heated to 47° C. during loading.

A known volume (about 20 bed volumes) of solution was pushed through the column 16 at about 8.3 mL/minute flow rate (about 10 bed volumes per hour, based on the starting column volume). The effluent was collected for analysis.

The final 20 mL of effluent was collected separately to check that loading was complete. After loading, the ion exchange column bed volume had decreased to 40.8 mL.

Next, the ion exchange resin in column 12 was washed with about three bed volumes of the eluant solution at room temperature (about 8.3 mL/minute). The solution contained the same components as the loading solution, but with no added iron. The solution contained 35 g/L copper(II) ions, 0.1 g/L cobalt(II) ions, and 160 g/L $H_2SO_4$. The wash solution was collected for analysis.

Eluant solution was poured into the reservoir 24 and pumped up through the copper column 14. The copper and ion exchange burettes 16, 18 were connected by a short length of about ⅛ inch i.d. Viton® tubing t. Connections between the reservoir 24 and burettes 16, 18 were made with the same tubing t. The rubber stoppers 48, 49 atop the burettes 12, 14 (respectively) were wrapped with PVC tape to minimize air ingress at these points. The precise volume of eluant was determined later.

Once all the eluant was added, the system was closed and heating water circulation was begun. With each 5° C. rise in temperature, the stopcock 34 attached to the reservoir 24 was opened briefly to vent excess pressure. Once the desired temperature was reached, the system was thereafter accessed only under a nitrogen gas flow. The eluant solution was pumped around at about 8 mL/minute.

Samples were taken at one or 1.5 hour intervals for 8.5 hours. Later samples were subjected to preliminary analysis by atomic absorption spectroscopy to check that a steady state had been achieved. Roughly 3 mL samples were taken. The weight of each sample taken was noted. From the measured density at room temperature, the volume was calculated. After cooling to room temperature, a 2.00 mL portion was treated with a small amount of 30 percent hydrogen peroxide solution to oxidize any iron(II) ions to iron(III) ions, and then was diluted to 100.0 mL. All sample volumes are referenced to room temperature.

At the end of the study, the aqueous phase from the ion exchange column 12 was collected and the ion exchange resin in the column 12 was then washed with about 3 bed volumes of 160 g/L $H_2SO_4$ and the combined effluent plus washings were treated with 30 percent hydrogen peroxide and diluted to 250.0 mL.

Samples were analyzed by atomic absorption spectroscopy for iron. Samples and atomic absorption standard solutions were treated to contain similar levels of $CuSO_4 \cdot 5H_2O$ (about 730 parts per million copper), $H_2SO_4$ (3.2 g/L) and one percent by weight of $HNO_3$, so that reliable analyses for iron could be obtained.

The results are listed in the following tables. The data below summarize the results. The mass of iron loaded was calculated by difference of the total iron pumped onto the ion exchange column 12 less the total iron in the effluent and wash. The final column volume after loading (40.8 mL) was used to calculate the concentration of iron on the ion exchange resin.

The steady state average iron concentration in the eluant is the average of the last six samples (2 to 8.5 hours). The iron eluted quite rapidly (by about 2 hours). This is evident from the analysis of the samples of the eluant solution that was recirculating at about 8 mL/min through the copper column 14 and the ion exchange column 12 to be regenerated that were taken every hour or hour and a half. The total amount of iron that had been loaded onto the column 12 was about 0.6 g iron. The total amount of iron that was recovered from the ion exchange column 12 to be regenerated was also about 0.6 g iron. The iron concentration in the circulating eluant reached a steady state of about 5.2 g/L iron by the 2 hour time point.

The final circulating eluant volume (at room temperature) was calculated from the total mass of iron in the final recovered solutions from the ion exchange and copper columns, 12, 14, divided by the steady state average iron concentration. The initial eluant volume also includes the volumes of samples.

The total mass of iron eluted is the sum of the 5 masses in the two final column solutions plus the mass of iron in each sample. Iron recovery is calculated as the ratio of recovered iron over loaded iron. The results indicate quantitative recovery of the iron.

| | | | |
|---|---|---|---|
| Column Temperature | | | 84° C. |
| Iron Concentration in Loading Solution (g/L) | | | 1.480 |
| Mass of Iron Loaded (g) | | | 0.5912 |
| Iron Concentration on Ion Exchange Resin (g/L) | | | 14.49 |
| Final Steady State Iron Concentration in Eluant (g/L) | | | 5.184 |
| Initial Circulating Eluant Volume (mL) | | | 118.6 |
| Final Circulating Eluant Volume (mL) | | | 98.99 |
| Total Mass of Eluted Iron (g) | | | 0.6118 |
| Percent Iron Recovery (%) | | | 103.5 |
| Solution: | Volume (mL) | [Fe] (g/L) | Mass Fe (g) |
| Volume pumped onto column | 1006.85 | 1.480 | 1.4801 |
| Effluent Collected: | | | |
| Combined less final sample | 981 | 0.7435 | 0.7294 |
| | 20 | 1.480 | 0.0296 |
| Total Effluent Collected | 1001 | | |
| Volume of eluant used to wash the column | 152 | 0.8211 | 0.1400 |
| Total mass of iron in effluent | | | 0.8990 |
| Mass of Iron loaded bnto resin | | | 0.5912 |
| [Fe] on resin (g/L) | | 14.48 | |
| Initial eluant | | not observed | |
| Sample Time (hour) | | | |
| 1.07 | 2.78 | 4.143 | 0.011618 |
| 2 | 2.49 | 5.159 | 0.012846 |
| 3.5 | 2.76 | 5.258 | 0.014507 |
| 5 | 2.84 | 5.130 | 0.014569 |
| 6.5 | 2.96 | 5.165 | 0.015288 |
| 8 | 2.60 | 5.21 | 0.013556 |
| 8.5 | 3.17 | 5.178 | 0.015414 |
| Steady State Average for iron in solution in column | | 5.154 | |
| Iron in ion exchange column final solution | 250 | 0.8915 | 0.2229 |
| Iron in copper column and well final solution | 250 | 1.181 | 0.29025 |
| Total iron in column aqueous phase | | | 0.51315 |
| Circulating eluant volume Final (calculated as total iron in solution divided by average [Fe]) | 98.99 | | |
| Initial (before removing any samples | 118.59 | | |
| Total mass of iron in aqueous phase | | | 0.6118 |
| Total mass of iron loaded | | | 0.5812 |
| Percent Recovered Iron (%) | | | 103.5 |

EXAMPLE 2

Recovery of Ferric Ion at 65° C. and 75° C. using Cuprous Ion

Elution test similar to that described in Example 1 were carried out at 75° C. and 65° C. In the 75° C. test, stock eluant solution (containing no iron) was used to wash the final eluant out of the ion exchange and copper columns and the reservoir and tubing. In the 65° C. test, 160 g/L $H_2SO_4$ was used to wash out the final eluant (as it was in Example 1). In the 65 and 75° C. tests, the final eluant solution was collected from the ion exchange column, copper column, reservoir and tubing into a single 500 mL flask. In Example 1 the final eluant in the ion exchange column had been collected separately from the final solution in the rest of the system. There was no analytical benefit to the approach taken in Example 1. Other than these procedural differences the tests were run identically. All volumes are referenced to room temperature.

Iron recoveries were quantitive in each case (102.3% at 75° C.; 102.3% at 65° C.), essentially the same as in Example 1. Times required to reach steady state were about 3 hours at 75° C. and about 4 hours at 65° C., compared to approximately 2 hours at 84° C. as described in Example 1.

| | 65° C. | 75° C. |
|---|---|---|
| Column Temperature | | |
| Iron Concentration in Loading Solution (g/L) | 1.460 | 1.449 |
| Mass of Iron Loaded (g) | 0.5678 | 0.5708 |
| Iron Concentration on Ion Exchange Resin (g/L) | 13.27 | 13.28 |
| Final Steady State Iron Concentration in Eluant (g/L) | 4.717 | 4.763 |
| Initial Circulating Eluant Volume (mL) | 126.0 | 124.3 |
| Final Circulating Eluant Volume (mL) | 109.7 | 107.9 |
| Total Mass of Eluted Iron (g) | 0.5806 | 0.5842 |
| Percent Iron Recovery (%) | 102.3 | 102.3 |

EXAMPLE 3

Multiple Cycles of Iron Removal and Regeneration of the Ion Exchange Resin

An ion-exchange and regeneration system was constructed similar to the equipment arrangement used in Example 1 to conduct an experiment where multiple iron-containing model copper EW solutions were passed through the ion exchange resin. In this experiment, the ion exchange resin was regenerated between cycles using a model eluant solution that had been passed through a copper(0)-containing column according to the invention.

A model copper EW solution was made containing about 1.5 g/L iron(III) in the form of $Fe_2(SO_4)_3 \cdot 5H_2O$ (97 percent purity), 35 g/L copper(II) as $CuSO_4 \cdot 5H_2O$, 0.1 g/L cobalt(II) as $CoSO_4 \cdot 7H_2O$, and 160 g/L $H_2SO_4$, filtered prior to use. A model eluant solution was made like the model EW solution, but omitting the iron(III).

The equipment arrangement shown in FIG. 1 also shows the equipment that was utilized in the present example. As in Example 1, the arrangement included two columns 12, 14 that were water-jacketed 50 mL burettes 16, 18. One burette 16 contained ion exchange resin and the other burette 18 contained copper wire cuttings.

All tubing in the "elution model" arrangement was ⅛ inch inner diameter VITON™. PVC tubing was used where solutions at or near room temperature were to be transferred. Pumps 24, 26, 68 were peristaltic types. A reservoir 24 was set up at the base of the columns through which eluant solution passed.

The equipment was operated in two modes: loading mode and elution mode.

In the loading mode, the effluent exiting the ion exchange column 12 was diverted to the drain 64, and not allowed to enter the eluant reservoir 24 by closing the tubing clamp 62. The iron-containing model copper EW solution was loaded onto the ion exchange column 12 through pump 68 by connecting stopper 66 to the top of the ion exchange burette 16. The effluent from the load was collected through the drain 64. The ion exchange column 12 was maintained at 45 EC during loading. The ion exchange resin in column 12 was washed with 160 g/L $H_2SO_4$ pumped through pump 68.

In the elution mode, the ion exchange column 12 was reconnected to stopper 48. Eluant solution was pumped up from the reservoir into the ion exchange resin burette 16 through pump 26. Eluant solution was also pumped up through the copper burette 18 through pump 24. A short length of Viton™ tubing t was used to connect the tops of the columns at stoppers 48, 49. The stoppers 48, 49 were sealed with PVC tape. The pump 26 was used to force eluant solution up through the ion exchange column 12. After that step, pump 26 was disconnected from the tubing, although the tubing still remained connected to the system.

The columns were heated to 75 EC. As in Example 1, supplemental heating of the water jackets 42, 44 was required. Heating tape and glass wool insulation (not shown) were used. As the closed system was heated, the internal pressure was periodically vented through the stopcock 34 of the sampling port. Once the temperature was achieved, the eluant could be circulated using pump 24 up through the copper column 14 as indicated by arrow 20, and down through the ion exchange column 12 as indicated by arrow 22.

In the elution mode, the system was closed except for brief periods during sampling. Sampling of the eluant solution was achieved through a sampling port as illustrated in FIG. 1.

The top of stopcock 34 was fitted with a rubber septum 32. A small plastic housing (not shown) through which nitrogen was passed was attached to the rubber septum 32. A syringe fitted with fairly rigid Tefzel™ tubing (not shown) was pushed through the septum 32 and the hole in the stopcock 34 to draw solution sample from the reservoir 24 containing eluant. There were no metal parts in contact with the sample. The flow of nitrogen into the septum 32 minimized ingress of air during sampling. All sample and solution volumes were referenced to room temperature.

Atomic absorption spectroscopy was used for iron analysis. To minimize interference, both the samples and standard solutions were matched for major components, and contained about 700 ppm copper(II), 3.2 g/L $H_2SO_4$, and 10 g/L $HNO_3$. Samples containing $Fe^{2+}$ were treated with 30 percent $H_2O_2$ to oxidize the iron to $Fe^{3+}$ for analysis.

Prior to use, the ion exchange resin was stirred gently with 200 g/L $H_2SO_4$ for one hour. The ion exchange resin slurry was then poured into the burette 16 and washed with 160 g/L $H_2SO_4$ (about 200 mL at 7.4 mL/min) to give an initial bed volume of about 50 mL.

For loading of onto the ion exchange column, the columns 12, 14 were heated to 45 EC. The iron-containing model copper EW solution was loaded onto the ion exchange column 12 using pump 68 and stopper 66 as described above.

The effluent of the load was collected via the drain 64 by closing clamp 62 and opening clamp 63. Near the end of the loading step, a sample of the column effluent was collected separately. The ion exchange resin in column 12 was then washed with 160 g/L $H_2SO_4$. The effluent of the wash solution was collected separately. The effluent of the load and the effluent of the wash were analyzed for iron and copper content.

Finally, the ion exchange column was drained and purged with nitrogen gas for 25 minutes. The flow of nitrogen was not great enough to thoroughly blow out residual solution due to high back pressure of the ion exchange column 12. The purged out solution was collected with the wash liquid. An unknown volume of sulfuric acid solution remained in the column.

In the elution mode, the ion exchange column 12 was reconnected in the closed system by reattaching stopper 48. The clamp 63 on the drain tubing 64 was closed. Eluant solution was pumped through pump 26 into the ion exchange column until it was full. Eluant was pumped through pump 24 into the copper column 18 until the burette was full. Pump 26 was disconnected from the tubing after this step (the tubing remained connected to the system). During these pumping operations, the sampling port stopcock 34 was open and the reservoir 24 was blanketed with nitrogen. Because of the unknown residual volume of acid wash solution left in the ion exchange column, the precise total volume of solution in the closed elution system was not known.

The columns were connected between the stoppers 48 by a short length of Viton™ tubing t. The water bath 40 and columns 12, 14 were heated to 75 EC. The eluant was circulated at about 8 mL/min for 2.5 hours. The pump 24 was calibrated to operate at 8 mL/min at atmospheric pressure. The actual flow rate of eluant solution in the system is not known.

After elution of the iron from the ion exchange resin, the tubing atop the ion exchange column was disconnected from the burette 16 and sealed. The solution in the copper burette 18 was not drained into the reservoir 24, but remained in contact with the copper cuttings.

The solution in the ion exchange column was drained into the reservoir and nitrogen was used to purge out as much residual solution as possible. The duration of the nitrogen purge was 25 minutes. During the nitrogen purge step, the columns 12, 14 were allowed to cool to 25–45 EC.

After the nitrogen purge step, clamp 62 was closed. The ion exchange column was back-flow filled with 160 g/L $H_2SO_4$ using a pump (not shown) connected to the drain tubing 64 with clamp 63 open.

Once the ion exchange column was full of acidic wash solution, the stopper 66 having pump 68 was connected to the top of the burette 16, and the ion exchange column 12 was washed with 160 g/L $H_2SO_4$. The effluent of the wash after elution was collected through the drain tubing 64.

Following the ion exchange column wash after elution, the ion exchange column was again nitrogen purged for 25 minutes, and the residual solution was collected with the wash effluent.

Another cycle of loading iron-containing model copper EW solution was begun using the still-connected stopper 66 and pump 68. The ion exchange column was loaded as before, with the columns maintained at 45 EC. The ion exchange column was washed with 160 g/L $H_2SO_4$ as before and nitrogen purged for 25 minutes. The same elution solution that had circulated previously was back-flowed onto the ion exchange column using pump 26 as described above, before reconnecting the stopper 48 to run the closed system in elution mode once again to regenerate the column.

A total of four loading and elution cycles were completed using the same recycling eluant solution. Between the first two cycles, the equipment was allowed to cool to room temperature overnight. The system was maintained closed under nitrogen atmosphere in elution mode during that time. The ion exchange column was stored in 160 g/L $H_2SO_4$. The second and third cycles were run the following day, and the system left overnight as before. The fourth cycle was run the third day.

At the end of the test, the eluant was pumped out of the columns and reservoir into a flask. The columns were washed separately with 160 g/L $H_2SO_4$ (about 120 mL each) and the washings were combined with the eluant in the flask. The reservoir and tubing were rinsed out with 160 g/L $H_2SO_4$ and the rinses were also combined with the eluant in the flask. The quantitatively recovered eluant was diluted to 500 mL. Samples of the eluant were analyzed for iron and copper content.

The iron analysis results are shown in the following table. Iron built up in the eluant with each cycle, however the accumulation decreased in each following step. A maximum of 10.3 g/L iron in the eluant was realized. Iron loading gradually decreased with each cycle. The total iron eluted was 92 percent of the amount loaded. The extent of iron elution appeared to be a little below the extent of iron loading during each stage, suggesting that the elution cycle was not quite long enough to get quantitative elution. Note that the amount of iron in the eluant washes (e.g. 0.153 g, cycle 1) is significant compared to the amount eluted per cycle (0.567 g, cycle 1). If the amount of iron is compared to the eluant iron concentration at the end of the first cycle, a residual volume in the ion exchange column of 34.5 mL is suggested. Because the column was drained and purged prior to the wash step, this is not possible. The best explanation is that iron remains in the solution phase associated with the interior of the resin and then is removed in the washing step.

The final eluant volume was estimated by dividing the mass of iron recovered in the final eluant by the iron concentration in the final eluant sample. The sample volumes from each stage were added to get an estimate of the initial volume. It is this estimate of the volumes that is required to calculate the net iron eluted during each cycle.

The copper analysis is shown in the following table. Copper was significantly depleted from the eluant solution with each stage. The initial concentration was a little less than 35 g/L. Pure eluant solution at 35 g/L copper(II) was slightly diluted by the presence of residual $H_2SO_4$ wash solution in the ion exchange column after the first loading step. The final copper content of the eluant was 14 g/L. Again the major avenue of depletion is the washing step after elution, consistent with the loss of iron in the elution wash steps. Despite the extensive losses of copper(II) from the eluant, the elution of iron from the ion exchange column still appeared to function moderately well.

|  | Cycle 1 | Cycle 2 | Cycle 3 | Cycle 4 | Total |
|---|---|---|---|---|---|
| Iron loaded (g) | 0.604 | 0.578 | 0.512 | 0.464 | 2.157 |
| Bed Volume after loading (mL) | 42.3 | 40.2 | 40 | 39 |  |
| [Fe] on column (g/L) | 14.3 | 14.4 | 12.8 | 11.9 |  |
| [Fe] in eluant (g/L) | 4.444 | 7.341 | 9.206 | 10.30 |  |
| Iron lost to | 0.005 | 0.012 | 0.025 | 0.026 | 0.068 |

-continued

|  | Cycle 1 | Cycle 2 | Cycle 3 | Cycle 4 | Total |
|---|---|---|---|---|---|
| samples (g) | 7 |  |  |  |  |
| Iron lost to wash after elution (g) | 0.153 | 0.229 | 0.298 |  | 0.681 |
| Iron in final eluant (g) |  |  |  | 1.231 | 1.231 |
| Total Iron eluted (g) | 0.567* | 0.520* | 0.462* | 0.432* | 1.981 # |
| Iron recovery (%) |  |  |  |  | 91.8 |
| Estimated final eluant volume (mL) |  |  |  |  | 119.5 |
| Volume of eluant samples (mL) | 1.29 | 1.61 | 2.75 | 2.48 | 8.13 |
| Estimated initial eluant volume (mL) |  |  |  |  | 127.7 |
| Copper passed through column (loading) (g) | 21.73 | 21.47 | 21.65 | 21.66 | 86.51 |
| Copper in load effluents (g) | 21.36 | 21.00 | 21.16 | 21.66 | 85.18 |
| Copper reporting to load effluents (g) |  |  |  |  | 98.47% |
| [Cu] in eluant (g/L) | 28.90 | 23.09 | 17.38 | 14.02 |  |
| Copper lost to samples (g) | 0.037 | 0.037 | 0.048 | 0.035 | 0.157 |
| Copper lost to wash after elution (g) | 1.200 | 0.973 | 0.781 |  | 2.954 |
| Total Copper losses (g) | 1.238 | 1.010 | 0.829 | 0.035 | 3.112 |
| Copper recovered from final eluant (g) |  |  |  | 1.899 | 1.899 |
| Total Copper accounted for in eluant (g) |  |  |  |  | 5.010 |
| Copper losses (%) |  |  |  |  | 62.1% |

*estimated value based on eluant volume estimates at each cycle.
analyzed.

EXAMPLE 4

Laboratory Studies with Plant Electrolytes

Ion exchange media as in the form of particles contained in columns can be used to separate and recover iron from SX-EW electrolyte bleed solutions. Initial studies with simulated copper electrolyte solutions using a column separation apparatus showed that ion exchange particles were selective for $Fe^{3+}$ over $Cu^{2+}$ and $Co^{2+}$. These results can be seen from the loading curves in FIG. 2 wherein $C/C_o$ represents the ratio of processed solution concentrations (C; column effluent) to initial metal ion concentrations ($Co_o$, column feed) in the synthetic electrolyte. A $C/C_o$ value less than one indicates species retention, $C/C_o$ equal to one indicates no retention, and $C/C_o$ greater that one indicates displacement of a previously retained metal into the effluent.

As the first column bed volume of electrolyte solution reached the outlet sample point, the value for $C/C_o$ rapidly approached one for copper and cobalt in this solution, indicating that the ion exchange particles did not retain copper and cobalt in strong acid solutions (150 g/L $H_2SO_4$). Ferric ion $C/C_o$ values remained low until the particles' geminal diphosphonic acid binding sites were exhausted after passage of more than ten bed columns of liquid, indicating that the particles were retaining a large fraction of the iron.

Additional laboratory studies with the ion exchange particles were performed using actual SX-EW plant electrolytes (FIG. 3). It is noted that some iron was observed in the initial column effluent, the $C/C_o$ value was 0.20. Ferrous ions [di-valent iron; iron(II)] were expected to be present in copper electrolyte at concentrations of 15–25 percent of the total iron and to exhibit behavior analogous to cobalt and copper by not loading on the ion exchange particles.

A number of laboratory column loading studies were performed with plant electrolyte. The observations from these studies indicated no loss of ion exchange particle capacity. The net operating capacity of the DIPHONIX® ion exchange particles was observed to be 8–12 g iron(III) per L particles.

The foregoing description and the examples are intended as illustrative and are not to be taken as limiting. Still other variations within the spirit and scope of this invention are possible and will readily present themselves to those skilled in the art.

We claim:

1. An ion exchange and regeneration process for the separation and removal of iron(III) ions from an aqueous sulfuric acid metal ion-containing solution that comprises the steps of:
    (a) contacting an aqueous sulfuric acid metal ion-containing solution that contains iron(III) ions as well as ions having a valence of less than +3 of at least one additional metal with solid ion exchange medium that binds said iron(III) ions in preference to the additional metal ions present to form a solid/liquid phase admixture, said ion exchange medium comprising insoluble cross-linked copolymer having a plurality of pendent geminal diphosphonate groups of the formula —CH(PO$_3$R$_2$)$_2$ or —C(PO$_3$R$_2$)$_2$—, wherein R is a mono- or divalent cation;
    (b) maintaining said contact with a sufficient amount of said solid ion exchange medium for a time period sufficient to form solid phase-bound iron(III) ions and an aqueous liquid phase containing sulfuric acid and said additional metal ions;
    (c) separating the solid and liquid phases;
    (d) contacting said separated solid phase-bound iron(III) ions with an aqueous SO$_2$-free reducing solution containing 0.1 to about 6 molar sulfuric acid and an amount of copper(I) ions sufficient to reduce the solid phase-bound iron(III) ions to iron(II) ions to form a second solid/liquid phase admixture;
    (e) maintaining said second solid/liquid phase admixture at a temperature of about 65° C. to about 95° C. for a time period sufficient to form an aqueous reducing solution liquid phase containing iron(II) ions and regenerated solid phase ion exchange medium; and
    (f) separating the iron(II)-containing liquid phase from the regenerated solid phase ion exchange medium.

2. The process according to claim 1 wherein the concentration of sulfuric acid in said aqueous sulfuric acid metal ion-containing solution is about 1 to about 3 molar.

3. The process according to claim 1 wherein said additional metal ions of said aqueous sulfuric acid metal ion-containing solution are selected from the group consisting of manganese(II), copper(II) and cobalt(II) ions.

4. The process according to claim 1 wherein said copper (I) ions are present in an amount of about 0.3 to about 1.0 molar.

5. The process according to claim 1 wherein said aqueous sulfuric acid metal ion-containing solution also contains iron(II) ions.

6. The process according to claim 1 wherein said ion exchange medium is in the form of particles.

7. The process according to claim 1 wherein said ion exchange medium also contains a plurality of pendent aromatic sulfonic acid groups.

8. An ion exchange and regeneration process for the separation and removal of iron(III) ions from an aqueous sulfuric acid metal ion-containing solution that comprises the steps of:
    (a) contacting an aqueous sulfuric acid metal ion-containing solution that contains about 1 to about 3 molar sulfuric acid, iron(III) ions and additional metal ions selected from the group consisting of iron(II), manganese(II), copper(II) and cobalt(II) with solid ion exchange particles that bind to said iron(III) ions in preference to said additional metal ions to form a solid/liquid phase admixture, said ion exchange particles comprising insoluble cross-linked copolymer particles having a plurality of pendent geminal diphosphonate groups of the formula —CH(PO$_3$R$_2$)$_2$ or —C(PO$_3$R$_2$)$_2$—, wherein R is a mono- or divalent cation;
    (b) maintaining said contact with a sufficient amount of said solid ion exchange particles for a time period sufficient to form solid phase-bound iron(III) ions and an aqueous liquid phase containing sulfuric acid and said additional metal ions;
    (c) separating the solid and liquid phases;
    (d) contacting said separated solid phase-bound iron(III) ions with an aqueous SO$_2$-free reducing solution containing 0.1 to about 6 molar sulfuric acid and an amount of copper(I) ions sufficient to reduce the bound iron(III) ions to iron(II) ions and form a second solid/liquid phase admixture;
    (e) maintaining said second solid/liquid phase admixture at a temperature of about 65° C. to about 95° C. for a time period sufficient to form an aqueous sulfuric acid liquid phase containing iron(II) ions and regenerated solid phase ion exchange particles; and
    (f) separating the iron(II)-containing liquid phase from the regenerated solid phase ion exchange particles.

9. The process according to claim 8 wherein the copper ions of the aqueous reducing solution of step (d) are provided by passing an aqueous solution of sulfuric acid and copper(II) ions over copper metal prior to said contacting.

10. The process according to claim 8 wherein copper(I) ions are present in said aqueous reducing solution in an amount of about 0.3 to about 3 grams/liter.

11. The process according to claim 8 wherein sulfuric acid is present in said aqueous reducing solution at a concentration of about 1 to about 3 molar.

12. The process according to claim 8 wherein said aqueous sulfuric acid metal ion-containing solution contains about 1 to about 10 grams/liter iron as iron(III) ions or a mixture of iron(II) and iron(III) ions, about 30 to about 50 grams/liter copper(II) ions and about 0.05 to about 0.2 grams/liter cobalt(II) ions.

13. The process according to claim 8 wherein at least 50 percent of the solid phase ion exchange particles are regenerated in step (e).

14. The process according to claim 8 wherein said ion exchange particles are contained in a column and each step of contacting and maintaining contact with said ion exchange particles is carried out within said column.

15. The process according to claim 14 wherein each separation of solid and liquid phases from a solid/liquid phase admixture is carried out by decantation of the liquid phase from the column.

16. The process according to claim 8 wherein said ion exchange particles also contain a plurality of pendent aromatic sulfonic acid groups.

17. An ion exchange and regeneration process for the separation and removal of iron(III) ions from an aqueous sulfuric acid metal ion-containing solution that comprises the steps of:
  (a) contacting solid phase ion exchange particles contained in a column with an aqueous sulfuric acid di- and trivalent metal ion-containing solution to form a solid/liquid phase admixture,
  said aqueous sulfuric acid di- and trivalent metal ion-containing solution containing (i) about 1 to about 3 molar sulfuric acid, (ii) about 1 to about 10 grams/liter iron as iron(III) ions or as a mixture of iron(II) and iron(III) ions, (iii) about 30 to about 50 grams/liter copper(II) ions and (iv) about 0.05 to about 0.2 grams/liter cobalt(II) ions,
  said solid phase ion exchange particles binding to said iron(III) ions in preference to the other enumerated ions, and comprising insoluble cross-linked copolymer particles having
    (i) a plurality of pendent geminal diphosphonate groups of the formula $-CH(PO_3R_2)_2$ or $-C(PO_3R_2)_2-$, wherein R is a mono- or divalent cation and
    (ii) a plurality of pendent aromatic sulfonic acid groups;
  (b) maintaining said contact with a sufficient amount of said solid ion exchange particles for a time period sufficient to form solid phase-bound iron(III) ions and an aqueous liquid phase containing sulfuric acid and said divalent metal ions;
  (c) separating the solid and liquid phases;
  (d) contacting the column-contained solid phase-bound iron(III) ions with an $SO_2$-free aqueous reducing solution containing about 1 to about 3 molar sulfuric acid and copper ions present at about 1 to about 35 grams/liter to reduce the bound iron(III) ions to iron(II) ions and a form second solid/liquid phase admixture;
  (e) maintaining said second solid/liquid phase admixture of about 65° C. to about 90° C. for a time period sufficient to form an aqueous sulfuric acid liquid phase containing iron(II) ions and a solid phase containing at least 50 percent regenerated solid phase ion exchange particles; and
  (f) separating the iron(II) containing liquid phase from the regenerated solid phase ion exchange particles.

18. The process according to claim 17 wherein said separation of step (c) is carried out using an aqueous solution containing about 1 to about 3 molar sulfuric acid.

19. The process according to claim 17 wherein said separation of step (f) is carried out using an aqueous solution containing about 1 to about 3 molar sulfuric acid.

20. The process according to claim 17 wherein the iron ions present in said aqueous sulfuric acid metal ion-containing solution are only iron(III) ions.

21. The process according to claim 17 wherein the copper ions of the aqueous reducing solution of step (d) are provided at a concentration of about 300 ppm to about 3 grams/liter by passing an aqueous solution of copper(II) ions in sulfuric acid over copper metal prior to said contacting.

* * * * *